United States Patent [19]

Nathanson et al.

[11] Patent Number: 5,696,514

[45] Date of Patent: Dec. 9, 1997

[54] LOCATION AND VELOCITY MEASUREMENT SYSTEM USING ATOMIC CLOCKS IN MOVING OBJECTS AND RECEIVERS

[75] Inventors: Harvey C. Nathanson, Pittsburgh; Charles W. Einolf, Jr., Murrysville; James L. McShane, Churchill Boro, all of Pa.; Elbert L. Cole, Jr., Catonsville, Md.

[73] Assignee: Northrop Grumman Corporation, Los Angeles, Calif.

[21] Appl. No.: 608,424

[22] Filed: Feb. 28, 1996

[51] Int. Cl.$^6$ .................................................. G01S 13/06
[52] U.S. Cl. .................................. 342/36; 342/31; 342/37
[58] Field of Search ................................. 342/29, 30, 31, 342/36, 37

[56] References Cited

U.S. PATENT DOCUMENTS

| | | | |
|---|---|---|---|
| 3,573,818 | 4/1971 | Lennon, Jr. et al. | 342/29 |
| 3,581,309 | 5/1971 | Shear et al. | 342/31 |
| 3,801,979 | 4/1974 | Chisholm | 342/31 |
| 3,882,497 | 5/1975 | Klass et al. | 342/32 |
| 3,900,847 | 8/1975 | Steele | 342/30 |
| 4,283,726 | 8/1981 | Spence et al. | 342/458 |
| 4,866,450 | 9/1989 | Chisholm | 342/410 |
| 5,113,193 | 5/1992 | Powell et al. | 342/25 |
| 5,192,921 | 3/1993 | Chantry et al. | 331/3 |
| 5,398,034 | 3/1995 | Spilker et al. | 342/357 |
| 5,434,570 | 7/1995 | Wurman | 342/26 |
| 5,590,043 | 12/1996 | McBurney | 364/449.1 |

OTHER PUBLICATIONS

M.A. Sturza, *GPS Navigation using Three Satellites and a Precise Clock*, Global Positioning Systems, vol. II, Washington, DC: The Institute of Navigation, pp. 122–131 (1984).

P. Misra and M. Pratt, *Role of the Clock in a GPS Navigation Receiver*, ATC Project Memorandum No. 42PM–SAT–NAV–0008, Massachusetts Institute of Technology, Lincoln Laboratory (May 1994).

J.H. Murphy and T.A. Skidmore; *A Low–Cost Atomic Clock: Impact on the National Airspace and GNSS Availability;* Proceedings of IONGPS–94; Salt Lake Convention Center, Salt Lake City, Utah Sep. 20–23, 1994; pp. 1–8.

*Primary Examiner*—John B. Sotomayor
*Attorney, Agent, or Firm*—Walter G. Sutcliff

[57] ABSTRACT

A coherent signal generated at a precise frequency determined by an atomic clock is transmitted by a moveable object. A receiver station compares the frequency of the coherent signal received from the moving object with a second coherent signal generated at the same precise frequency by an atomic clock in the receiver to determine the radial component of the velocity of the moveable object relative to the receiver as a function of the doppler shift of the transmitted signal. Low cost, low power, miniature atomic clocks with an accuracy of $10^{-11}$ make possible accurate measurements of velocities of only centimeters per second. Such velocity measurement can be used to enhance radar tracking in air traffic control and collision avoidance systems. These velocity measurements can also be used to resolve tracking ambiguities in precision location systems, such as prisoner, geriatric and airport ground control systems, where three or more receiver stations each having an atomic clock measure time of flight of the transmitted coherent signal to triangulate moving object position.

13 Claims, 4 Drawing Sheets

LOCATION AND VELOCITY MEASUREMENT SYSTEM USING ATOMIC CLOCKS IN MOVING OBJECTS AND RECEIVERS

BACKGROUND OF THE INVENTION

1. Field of the Invention

This invention relates to a system for precisely locating the position of a moving object, and more particularly to such a system which includes doppler-velocity-based multi-path error minimization using atomic clocks to generate coherent signals.

2. Background Information

There are various systems for determining the position of a moving object. Some of these determine position of the moving object for use by a fixed ground station, others provide the operator of the moving object with geographical position, and still others provide the moving object with position relative to other moving objects. An example of the first type of position system is an air traffic control radar system. The global positioning system (GPS) is an example of the second type, and a collision avoidance system is an example of the third type.

In some instances, primary radar is used to track the position of aircraft in an air traffic control environment. The primary radar transmits rf pulses which are reflected back to the radar antenna by the aircraft. The round trip travel time of the pulses together with azimuth and elevation angles of the antenna are used to determine aircraft position. Measurement period movement is used to determine the velocity of the aircraft from which the next position prediction is made for tracking. For nonmaneuvering aircraft, three measurement periods (antenna rotations) are used to obtain a reasonable estimate of velocity. More are required if the aircraft is turning or the signal is corrupted in any fashion. The accuracy of the velocity estimate using this method is three to five percent of the target velocity. Such a system is fundamentally limited by the sampling rate and positional accuracy measurement capability of the sensors used.

In some primary radar systems, doppler velocity is obtained by transmitting coherent pulses. The return pulses are homodyned with the transmitter pulses to determine the velocity dependent frequency shift. This doppler derived velocity is then used to aid in tracking the aircraft. However, in most instances the sampling rates limit the non-ambiguous doppler derived velocity to typically less than 100 nautical miles per hour.

Most air traffic control systems utilize secondary radar, such as Mode-S for instance. Such cooperative identification systems employ an interrogator that requests identification and altitude information from each aircraft. A transponder aboard the aircraft non-coherently replies with the requested information. A slant range and azimuth position of the aircraft are determined using conventional radar techniques. Since the system is non-coherent, doppler velocity information is not available.

OBJECTS OF THE INVENTION

The primary object of the invention is to provide improved location systems, especially ones which generate doppler velocity information for aid in tracking.

A more specific object of the invention is to provide a system for tracking low speed objects such as taxiing aircraft, and even persons, such as prisoners. Such slow movements produce very small doppler shifts requiring highly accurate measurement.

It is a further object of the invention to provide such systems which can accommodate for temporary loss of a signal due to blockage by an opaque object or multi-path errors caused by reflections.

It is also an object of the invention to provide improved radar systems including aircraft control, ground control and collision avoidance systems with non-ambiguous doppler velocity augmentation which does not require homodyning.

SUMMARY OF THE INVENTION

These objects and others are realized by the invention which is directed broadly to apparatus for determining the relative velocity of a moveable object. Signal generating means carried by the moveable object transmits a first coherent signal at a selected frequency. The apparatus further includes receiver means including means generating a second coherent signal at the selected frequency, means receiving the first coherent signal as a received first coherent signal having a shifted frequency dependent upon the relative velocity, and means determining the relative velocity of the moveable object from the difference between the shifted frequency of the received first coherent signal and the selected frequency of the second coherent signal. The single receiver embodiment of the invention is useful, for instance, in providing doppler-based velocity information for collision avoidance systems.

As another aspect of the invention, multiple receiver stations, each of which generate a coherent signal at the selected frequency determine a relative velocity of the moveable object with respect to it. These relative velocity components are then combined to generate a total velocity for the moveable object. This embodiment is useful for generating velocity information for position tracking systems. It is particularly useful for systems in which the coherent signals received by the multiple receiver stations from the moveable object are used in triangulating the position of the moveable object. The doppler-based velocity information aids in predicting the position of the object, thus minimizing errors resulting from full or partial blocking of a signal to a receiver or reflection of the transmitted signal.

The coherent signals are generated by atomic clocks located in the moveable object and each of the receiver stations. Means are provided to synchronize the absolute time maintained by the atomic clocks in each of the receivers. In another embodiment of the invention, the atomic clock in the moveable object is also synchronized to the absolute time maintained by the receivers so that the time of flight of each of the signals is directly measurable. Without synchronization of the absolute time of the atomic clock in the transmitter of the moveable object, an additional receiver is required to solve for this additional unknown. Recently developed miniature low cost, low power miniature atomic clocks with accuracies of $10^{-11}$ provide the capability of tracking the centimeter per second velocities typical for low speed tracking systems such as prisoner work release programs and aircraft ground control systems. They also make possible the accurate measurement of much higher velocities associated with the air traffic control and collision avoidance systems.

The transmitted signal can be a coherent pulse or a continuous wave (cw) signal, or a coherent pulse and a coherent cw signal each transmitted at a precise different frequency with the pulse signal used for triangulation and the cw signal used for generating doppler velocity information. In another arrangement, the doppler velocity generated from the cw signal can be integrated to track position.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

Figure 1:
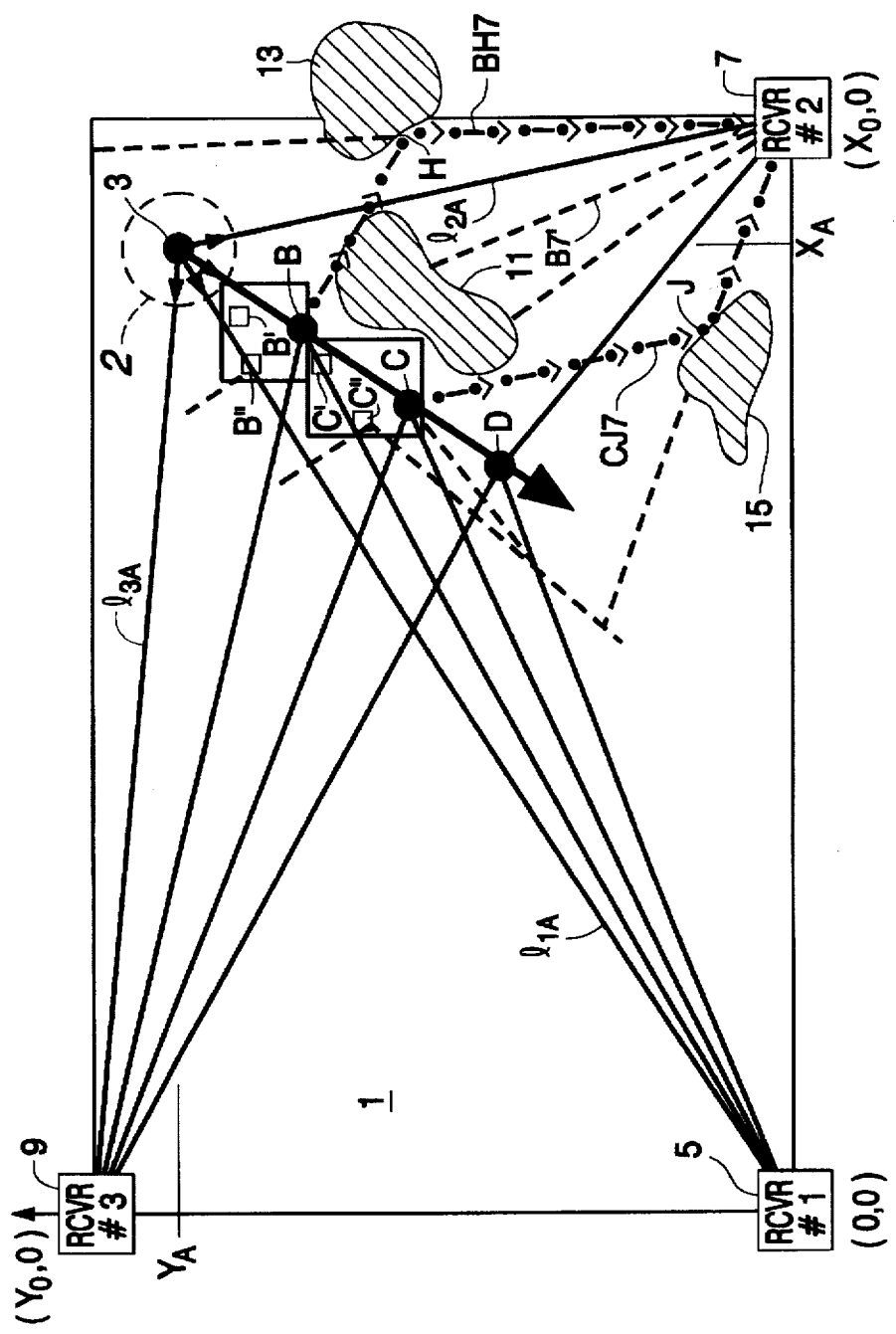
FIG. 1 is a schematic diagram illustrating an object tracking system in accordance with the invention.

FIG. 1 illustrates a precision location system 1 for tracking the location of a moveable object 3 utilizing at least three stationary receivers, numbers 1, 2 and 3, identified as 5, 7 and 9 respectively. Each of the receivers and the moveable object incorporate a low cost ultra-miniature atomic clock such as that described in U.S. Pat. No. 5,192,921 which is hereby incorporated by reference. At position A, the moveable object 3 transmits a pulse of rf energy which is received by the fixed receivers 5, 7 and 9 along the unobstructed radial paths connecting the transmitter to the receivers. The distance 1 along each of the unobstructed paths between point A and the receivers 5, 7 and 9 is as follows:

$$l_{1A} = c \times (t_{1A} - t_0) \qquad \text{Eq. 1}$$

$$l_{2A} = c \times (t_{2A} - t_0) \qquad \text{Eq. 2}$$

$$l_{3A} = c \times (t_{3A} - t_0) \qquad \text{Eq. 3}$$

where c=velocity of light in cm/sec and $t_{1A}-t_0$, $t_{2A}-t_0$ and $t_{3A}-t_0$ are the times for the signal to propagate from the moving object 3 at point A to receivers 5, 7, and 9, respectively. Using these three distances it is possible to triangulate and locate the position A using the following equation.

$$[x_i-x_A]^2+[y_i-y_A]^2=c^2[t_{1A}-t_0]^2=l_{iA}^2 \qquad \text{Eq. 4}$$

where $x_A$ and $y_A$ are the target coordinates of the moving object, $x_i$ and $y_i$ are the known fixed coordinates of each of the receiver stations, $t_i$ is the arrival time at each of the stations and $t_0$ is the exact transmission time. With the clocks of the receiver stations synchronized, the absolute arrival times are all known. Hence, there are three unknowns, the two planar coordinates of the moving object and the time $t_0$ that the moving object transmitted the signal. Thus, with the three receivers the equations can be solved for the three unknowns. If the z component of position which would be perpendicular to the plane of FIG. 1 were also of interest, an additional receiver would be required in order to solve for the four unknowns, or else if the clock in the moving object were synchronized precisely to the absolute time of the clocks in receiver stations, then $t_0$ would be known and only three receiver stations would be required to solve for the three position dimensions using known techniques.

The difficulty arises when the moving object 3 moves to positions B and C in FIG. 1 where an opaque obstacle 11 blocks direct paths from B and C to the second receiver 7. The receiver 7 may still receive the signal, which for instance may be reflected off of the point H of another object 13 from the position B or reflected from an object 15 at point J when in the position C. The triangulations calculated using the multipaths BH7 and CJ7, respectively for positions B and C, yield three triangulation results B, B' and B" and C, C' and C", only one of which in each trio is valid. The present invention resolves this problem using a doppler velocity estimator, and in particular one which does not depend on radar-like homodyning.

Since the moving object as well as the fixed receivers have an atomic clock, the moving object can not only transmit a fast rising pulse at a precise predetermined time, $t_0$, but that pulse can contain in its modulation a very accurate coherent frequency, $f_0$, determined by the accuracy of the moving object's atomic clock.

In accordance with this scheme, the three receivers 5, 7 and 9 also have their atomic clocks precisely internally generating $f_0$, such that each receiver can not only form the delay $(t_i-t_0)$, but also the vectorial velocity in the directions 1A, 2A, and 3A through the doppler relation:

$$v_{iA} = \frac{f_{Ri}-f_0}{f_0} \cdot c \qquad \text{Eq. 5}$$

where $f_{Ri}$ is the received frequency at the $i^{th}$ receiver. The received frequency $f_{Ri}$ will be higher than $f_0$ if the moving object 3 at the position A is moving toward the $i^{th}$ receiver. It should be noted that it is only by using atomic clocks with a stability of about $10^{-11}$ that velocities in the low cm/s range can be seen above the noise. Such low velocities are characteristic of human movement such as might be encountered in a prisoner tracking system for white collar prisoners on a work release program.

Figure 2:
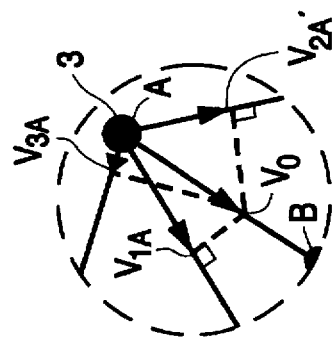
FIG. 2 is an enlargement of a section of FIG. 1 illustrating question of a doppler-based velocity in accordance with the invention.

FIG. 2 shows how the three doppler frequency shifts calculated using Equation 5 above can be combined to form $v_0$, the vector velocity at point A. If $\tau_{sample}$ in seconds is the time until the next transmission, the new coordinates at point B, starting from point A, for the $i^{th}$ receiver are:

$$\Delta x_i = v_{iA} \cdot \tau_{sample} = \frac{f_{Ri}-f_0}{f_0} \cdot C \cdot \tau_{sample} \text{ in centimeters.} \qquad \text{Eq. 6}$$

For example, if $f_{Ri}-f_0=8.3$ Hz, $f_0=10$ GHz and $\tau_{sample}=1$ sec., then $\Delta x \times (3)(8.3)$ or $\Delta x=24.9$ cm, the predicted position change on the $i^{th}$ direction. The procedure for minimizing the effects of multipath is to compare the three "calculations" B, B' and B" with the doppler prediction $B_p=A+v_0 \tau_{sample}$. The closest of the three points to $B_p$ is chosen as the correct new position in the presence of multipath. Note that if there is no obstruction in FIG. 1 to reflect the signal to the second station 7, only the position B will be generated in the vicinity of point A by the time-of-flight algorithm, although there will be another remote solution derived from the signals received by the first and third stations 5 and 9. In this case, the doppler predictor will verify that point B is the closest to the doppler prediction.

In what is a much more common situation, the obstruction 11 is only partially opaque, thereby passing a signal along the direct path B7' through the obstruction 11 but perhaps 10 db to 30 db down from the indirect reflected signal along the multipath BH7. In this case, the doppler predictor should enable the system to choose this lesser signal as the correct one, even through the signal is 100 times lower in power than the incorrect strong signals predicting B' and B".

Only an atomic clock in the moving object 3, accurately transmitting $f_0$ to an accuracy of $10^{-11}$ over many minutes, can expect, in a non-radar homodyne system such as is practical for a low-cost prisoner or airport asset tracking, to have the accuracy at fractional cm/s velocities to maintain good predictions of $v_0 \cdot \tau_{sample}$ for the extremely low $v_0$'s encountered in practice. That is because, for example, if the target is moving at only 3 cm/s (~1 in/s). The doppler shift percentage is only $v_0/c$ or $3 \times 10^0/3 \times 10^{10}$ ~1 part in $10^{10}$. Thus, an atomic clock with stability on order $10^{-11}$ or better will be required to sense the extremely small frequency shifts stably and reliably. In fact, with this kind of stability, it should be possible to even "count fringes" of the wavelength $c/f_0$ ~3 cm for $f_0$ on the order of 10 GHz, the clock frequency (about 9.192 GHz for Cesium). This fringe counting should be possible until one of the clocks drifts about one fringe, which can be as much as an hour or more for the miniature clocks in development.

Figure 3:
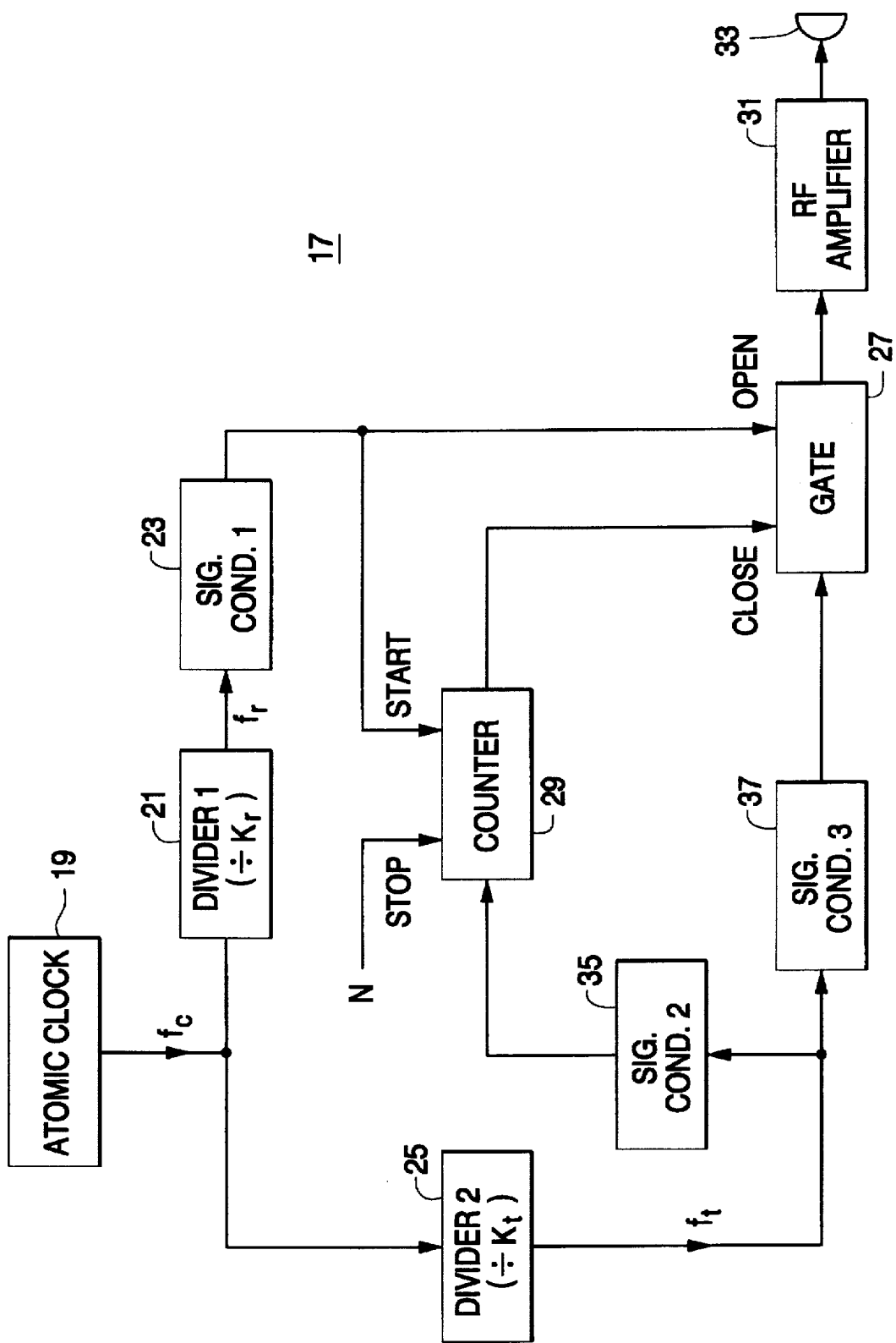
FIG. 3 is a block diagram of a transmitter circuit which forms part of the system of FIG. 1.

FIG. 3 illustrates and exemplary transmitting circuit 17 in the moving object 3. This circuit transmits a pulse of rf energy at intervals which are precisely controlled by an atomic clock 19. The clock also controls the transmitted frequency and the number of cycles included in the pulse. The clock 19 provides a continuous output at a constant frequency, $f_c$, which for the Cesium clock is 9.192 GHz. A first divider 21 provides an output at frequency, $f_r = f_c/K_r$, is converted to a train of trigger pulses by a first signal conditioner 23 and used to initiate the transmit pulse (i.e., $f_r$ is the pulse repetition frequency). If for example, $f_r = 1$ kHz, then $K_r = 10^7$. A second divider 25 produces the transmitted frequency, $f_t = f_c/K_t$. If $K_t = 10$, $f_t$ would be 919 MHz, which is near the center of the 902 to 928 MHz band in which current location systems operate. A gate 27, which controls the duration of the output pulse, is opened by the trigger pulse and closed by a pulse from a counter 29 after a preset number of cycles, N, are transmitted. The counter 29 is started by the same trigger that opens the gate. If $f_t$ is too high for the counter, the frequency of the counter input could be further divided; then the number of cycles in the output pulse would be multiples of N. The gate output is fed to a power amplifier 31, which drives the antenna 33. Second and third conditioners 35 and 37 amplify, filter, or otherwise condition or modify the signals for the counter 29 and for the gate 27 as necessary.

By way of example, if the maximum distances between the moving object 3 and the receivers 5, 7 and 9 were about 1 mile the maximum travel times would be about 6 μs. For location of a single moving object 3, as in a basic form of the invention, the repetition frequency could be relatively high, as indicated above. However, in a system in which many targets were monitored, and in which the transmitted signal must include data identifying the moving object, this frequency would be limited to a much lower value.

Figure 4:
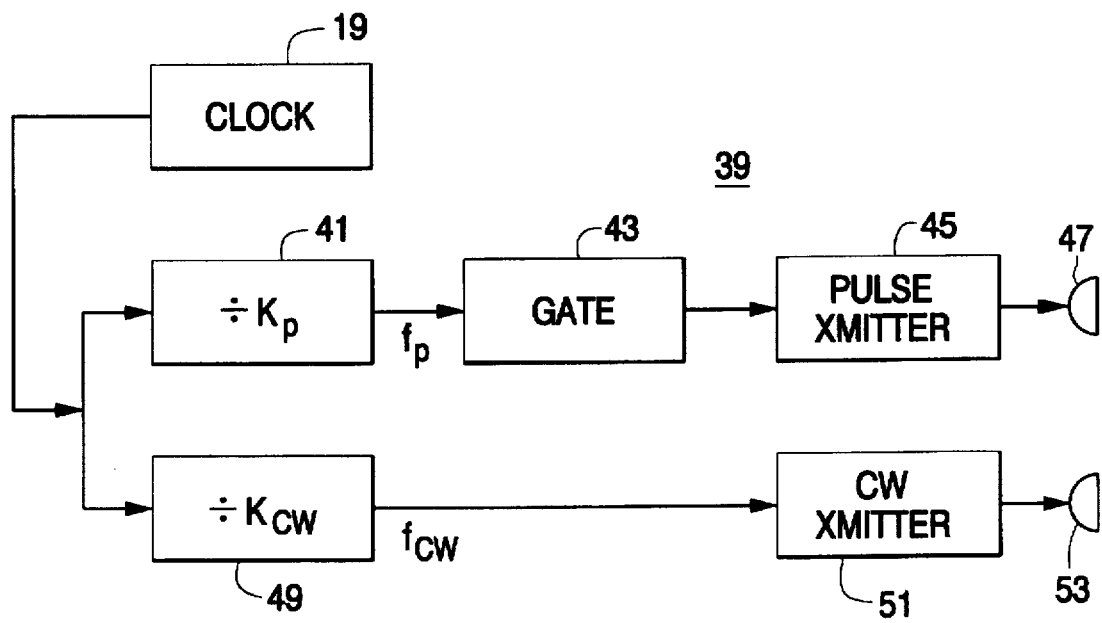
FIG. 4 is a block diagram of another embodiment of a transmitter circuit in accordance with the invention.

In accordance with another aspect of the invention, a transmitting circuit transmits a continuous wave (cw) signal for doppler sensing of target velocity and a pulse signal for distance measurement. Each type of signal uses a separate frequency controlled by the atomic clock. FIG. 4 illustrates a simplified block diagram for such a transmitting circuit 39. In the circuit, a first divider 41 (comparable to the divider 25 in FIG. 3) generates a frequency $f_p$ for the pulse signal from the frequency of the clock 19. The gate 43 generates pulses at the frequency $f_p$ in a manner described in connection with FIG. 3 for generation of the transmitted pulse signal by the pulse transmitter 45 for propagation by the antenna 47. Another divider 49 generates the cw signal at a frequency $f_{cw}$ for transmission by the cw transmitter 51 through the antenna 53. As an alternative, the event at the moving object that marks $t_0$ could be a rapid phase or other change of the cw carrier instead of the beginning of a pulse. In yet another arrangement, the doppler shift frequency could be continuously integrated to provide position information.

Figure 5:
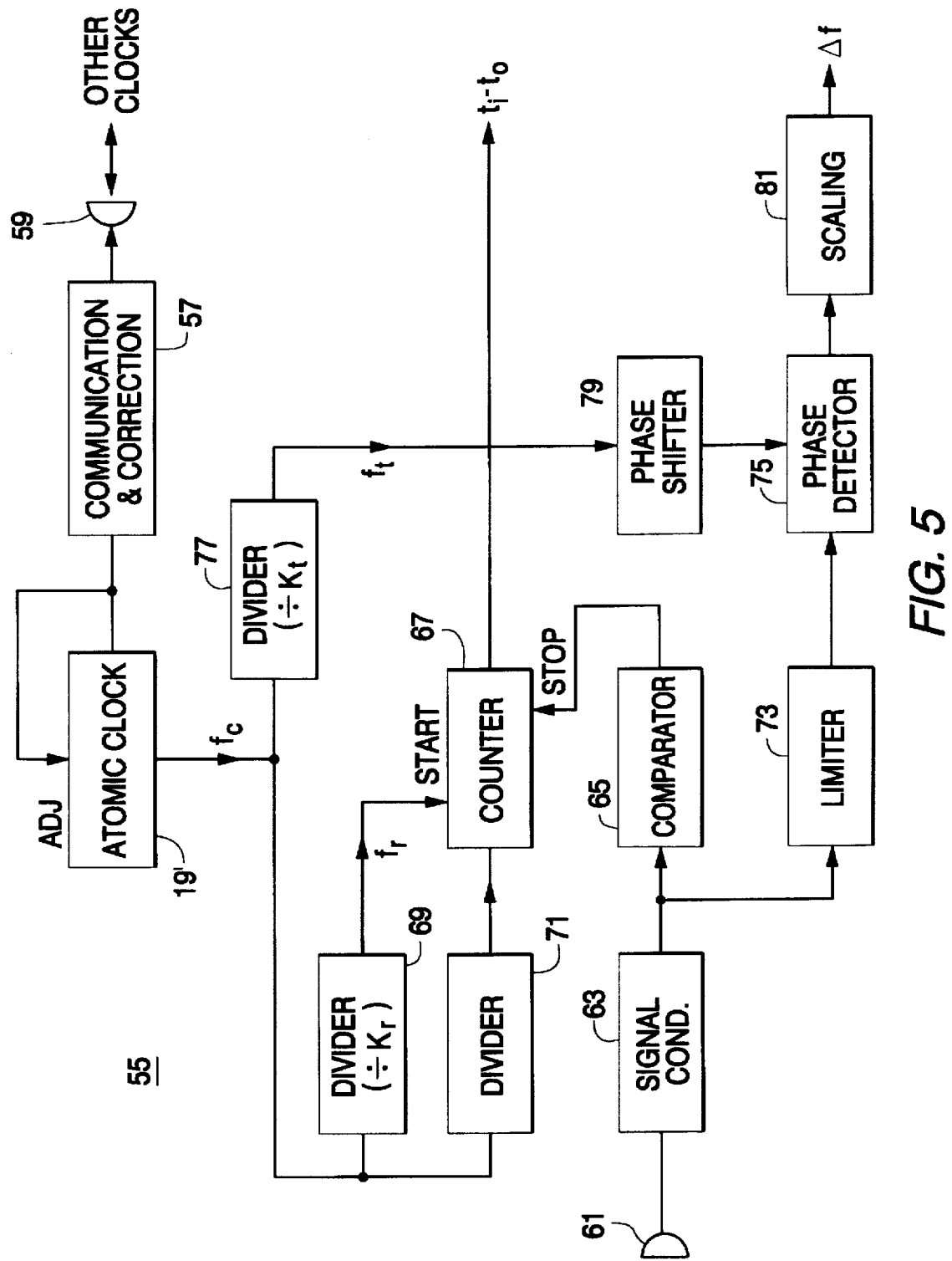
FIG. 5 is a block diagram of a receiver circuit which forms part of the system of FIG. 1.

An exemplary receiving circuit 55 provided in each of the receiver stations 5, 7 and 9 is shown in FIG. 5. Each of the receiver stations has an atomic clock 19'. The clocks 19' in the receivers are synchronized by communication and correction circuitry 57. In the system shown, communication is implemented through broadcast signals using an antenna 59. As the precise distance between the stations must be known, closed communication system such as a fiber optic network can also be used.

The frequency of the received signal is $f_t + \Delta f$ where $\Delta f$ is the doppler shift. For travel time measurement $(t_i - t_0)$, the arrival of the pulse received by receiver antenna 61 conditioned by signal conditioner 63 is detected by a comparator 65. If the signal amplitude exceeds a selected threshold, the comparator 65 output pulse stops a counter 67 which was started at time $t_0$. The start time $t_0$ is determined by the atomic clock 19', which as mentioned above is synchronized with all the other clocks. Trigger pulses to start the counter 67 occur at the repetition frequency $f_r$ obtained as in the transmitting circuit, by dividing the clock frequency $f_c$ by the factor $K_r$ in the divider 69. The travel time, $t_i - t_0$, is equal to the count divided by the frequency being counted which is determined from the clock frequency by another divider 71.

The signal path in receiving circuit 55 for the doppler shift measurement includes a limiter 73 which removes amplitude variations. Doppler frequency $\Delta f$ is determined by sensing with a phase detector 75 the change in phase between the received signal and a reference signal during a specified time interval, e.g., the duration of the received pulse. The coherent reference signal is generated by the divider 77 from the clock frequency $f_c$ at precisely the frequency of the pulses generated by the transmitting circuit. The two signals supplied to the phase detector 75, that is the received pulse and the reference pulse, may be out of phase at the beginning of the received pulse because the initial phase difference depends upon the travel time of the pulse. This initial phase difference is sensed and eliminated by a phase shifter 79. The doppler frequency is equal to $(\Delta \phi)/\tau$, where $\Delta \phi$ is the phase shift after a time $\tau$. A scaler 81 converts the output to a desired form.

Figure 6:
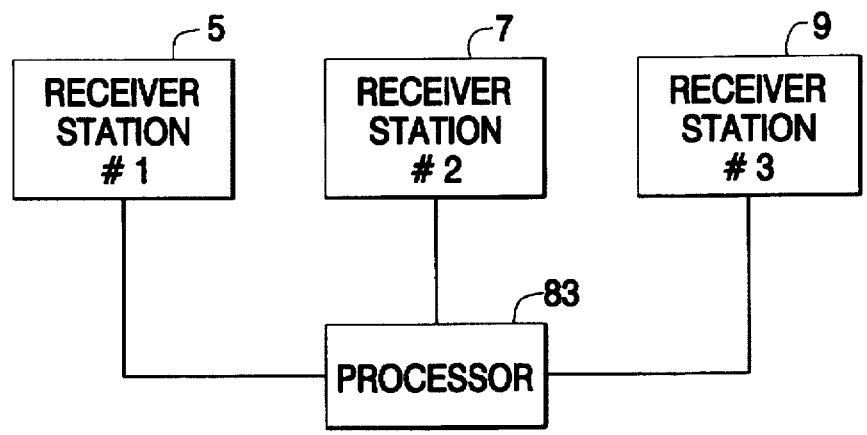
FIG. 6 is a schematic diagram in block form of a circuit for generating the doppler-based velocity illustrated in FIG. 2.

Communication between receiving stations 5, 7 and 9 is required so that measurements at each station can be combined. As shown in FIG. 6, a central processor 83 performs this function. Processor 83 may be located at one of the receiver stations or at any other location. As mentioned, time delays between stations must be taken into account because their magnitudes are similar to the object-to-station delays.

Besides prisoner tracking, the present invention can be applied to current air traffic control systems to provide an accurate non-homodyned location system. The doppler information generated by the invention can be used in both the primary radar systems and the secondary radar system such as Mode S described above. In the case of a secondary radar, the atomic clock is provided in both the interrogator and the aircraft transponder. This provides reliable non-ambiguous doppler-derived velocity information to both the interrogator and the transponder. The doppler information derived by the interrogator is added to the aircraft positional reports for use by the automation system. The velocity data will greatly improve the tracking capability of the air traffic control system in terms of accuracy, resolution and dealing with maneuvering aircraft. The doppler information derived by the transponder is used to improve the collision avoidance capability currently being added to aircraft. The collision avoidance systems presently installed on aircraft have no good means to determine the velocity of the aircraft except by the positional movement means noted. This technique will improve the ability of the aircraft to sense threatening aircraft near it and lead to safer air travel.

Another area of large concern today is the problem of collisions of aircraft on the ground in bad visibility. This includes collisions of aircraft with one another and with other vehicles that travel on the runway surface, such as fuel tracks, baggage trains and the like. For this application, a system of omnidirectional receive antennas, similar to that illustrated in FIG. 1, receives the Mode S (and ATCRBS) waveforms radiated by aircraft on the airport surface. The aircraft transponders have a mode in which they can radiate low power signals at a 1 Hz rate; these are known as "squitters". Position can be sensed using the time of arrival techniques discussed above, but more importantly, accurate velocity data will be available with the use of atomic clocks. The resolution of rf multipath conditions, which are especially severe on an airport, is greatly eased having accurate velocity for the slow moving vehicles. This concept can be extended to provide low cost, atomic clock equipped rf transponders for all vehicles that travel the airport surface. With such a system, all such vehicles can be tracked, which is essential to prediction and avoidance of collisions. The atomic clock provides the high accuracy needed, but at an affordable cost for this application.

Certain popular tracking techniques incorporate an algorithmic feature known as M-furcation to aid in resolving ambiguous situations. For example, consider the case where a track exists and two new position measurements indicate positions in the near vicinity of the track. The classic problem to solve is which of the two measurements belong to the track? Expand this situation to many tracks having many measurements: how is the proper pairing to be done? The most straightforward method (given no information to bias the outcome) is to guess, that is arbitrarily assign all the new measurements to the track and hope for the best. For nonmaneuvering tracks this method works reasonably well but not so well when the tracked object is maneuvering between the measurement intervals. The M-furcation approach allows possible associations to update the track position: M-1 tracks would be created in addition to the existing track. In time, due to the lack of future measurement updates, all tracks except for the real one would die and we have guaranteed that the track will survive the ambiguity situations. On the other hand, there can be a wide divergence in possible positions while multiple tracks survive.

The availability of doppler data adds another discriminant to resolve more quickly the correct measurement under conditions of the large growth of track pairing. The rapid removal of the incorrect pairings is essential to prevent geometric growth of the quantity of tracks and the accompanying positional uncertainty to be dealt with. For the postulated scenario in FIG. 1, M-furcation techniques will be useful to improve track continuity, given a large population of prisoners to be tracked in a severe multipath environment.

In accordance with the invention, both the moving object and at least one receiver contain low cost, small, low-power, atomic clocks accurate to one part in $10^{-11}$ during tracking periods of interest, typically on the order of hours. Such mutual stability in both the transmitter moving object clock and the receiver clock allows accurate doppler determination of velocity to be achieved. This is in addition to conventional positional information provided by the typical time-of-flight calculation where at least three receiver stations are used. The doppler positional prediction is compared to the time of flight information to permit resolution of multiple tracks occurring due to multiple path lengths often associated with opaque/reflective obstructions.

The doppler positional prediction capability provided by the invention greatly increases the accuracy in multipath environments of prisoner and geriatric tracking systems, air traffic control systems, collision avoidance systems, and airport ground-location systems.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. Apparatus for determining a relative velocity of a moveable object comprising:

signal generating means carried by said moveable object transmitting a first coherent signal at a selected frequency;

receiver means separate from said moveable object and having means generating a second coherent signal at said selected frequency, means receiving said first coherent signal as a received first coherent signal having a shifted frequency dependent upon said relative velocity, and means determining said relative velocity of said moveable object with respect to said receiver means as a function of a difference between said shifted frequency of said received first coherent signal and the selected frequency of said second coherent signal.

2. The apparatus of claim 1 wherein said receiver means comprises a plurality of receiver stations each having means generating a second coherent signal at said selected frequency, means determining relative velocity with respect to said receiver, and means combining said relative velocity with respect to each receiver to generate a total velocity signal.

3. The apparatus of claim 2 wherein said signal generating means comprises an atomic clock for generating said first coherent signal at said selected frequency and wherein said means in each of said plurality of said receivers generating said second coherent signal comprises an atomic clock.

4. The apparatus of claim 1 wherein said signal generating means carried by said moving object comprises first atomic clock means for generating said first coherent signal at said selected frequency and wherein said means generating said second coherent signal comprises a second atomic clock means.

5. The apparatus of claim 4 wherein said first atomic clock means comprises means generating a precise signal at a given frequency, means generating from said precise signal a derived signal at said selected frequency, and transmission means generating said first coherent signal from said derived signal.

6. The apparatus of claim 5 wherein said transmission means comprises a transmitter and means gating pulses of said derived signals to said transmitter for transmission as said first coherent signal.

7. The apparatus of claim 6 wherein said gating means comprises means generating a gating signal from said precise signal at a selected pulse repetition frequency, a gate responsive to said gating signals to gate said derived signal to said transmitter, and pulse generating means responsive to said gate signal to close said gate upon a lapse of a predetermined time period.

8. The apparatus of claim 7 wherein said pulse generating means comprises a counter counting cycles of said derived signal and closing said gate after a count of cycles of said derived signal corresponding to said predetermined time period.

9. The apparatus of claim 5 wherein said transmission means comprises means continuously transmitting said derived signal as a continuous wave signal.

10. Apparatus for determining location of a moveable object comprising:

transmitter means carried by said moveable object for transmitting a transmitted coherent signal containing a precise frequency; and receiver means comprising a plurality of spaced apart receiver stations, means determining a time of flight for said transmitted signal to reach each of said receiver stations, means determining a velocity component from a difference in frequency of said transmitted coherent signal as received at each receiver station and said precise frequency, and processor means determining said location from the time of flight for said transmitted coherent signal to reach each station and resolving any ambiguities in said location derived from said time of flight signals using said velocity components.

11. The apparatus of claim 10 wherein said transmitter means contains an atomic clock for generating said transmitted coherent signal at said precise frequency and wherein each of said receiver stations comprises an atomic clock generating a reference signal at said precise frequency and means comparing said transmitted signal as received to said reference signal to determine said difference in frequency.

12. The apparatus of claim 11 including means synchronizing time maintained by said atomic clocks in each of said receiver stations.

13. The apparatus of claim 12 wherein said means synchronizing time include means synchronizing time maintained by said atomic clock in said moveable object with said time maintained by said atomic clocks in said receiver stations.

* * * * *